(12) United States Patent
Lee et al.

(10) Patent No.: US 10,880,913 B2
(45) Date of Patent: Dec. 29, 2020

(54) EFFICIENT DATA SCHEDULING WITH SUPPLEMENTAL UPLINK CARRIER

(71) Applicant: QUALCOMM Incorporated, San Diego, CA (US)

(72) Inventors: Heechoon Lee, San Diego, CA (US); Wanshi Chen, San Diego, CA (US); Peter Gaal, San Diego, CA (US); Jing Sun, San Diego, CA (US); Peter Pui Lok Ang, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/188,759

(22) Filed: Nov. 13, 2018

(65) Prior Publication Data

US 2019/0150173 A1 May 16, 2019

Related U.S. Application Data

(60) Provisional application No. 62/587,420, filed on Nov. 16, 2017.

(51) Int. Cl.
*H04W 72/12* (2009.01)
*H04W 72/04* (2009.01)
(Continued)

(52) U.S. Cl.
CPC ........... *H04W 72/1268* (2013.01); *H04L 5/00* (2013.01); *H04W 16/28* (2013.01);
(Continued)

(58) Field of Classification Search
CPC ........... H04W 72/1268; H04W 72/042; H04W 76/27; H04W 16/28
See application file for complete search history.

(56) References Cited

U.S. PATENT DOCUMENTS

| 9,544,887 | B2* | 1/2017 | Kim | .............. H04L 5/0048 |
| 2012/0009923 | A1* | 1/2012 | Chen | .............. H04L 5/0053 |
| | | | | 455/434 |

(Continued)

FOREIGN PATENT DOCUMENTS

| EP | 3188563 A1 | 7/2017 |
| WO | WO-2017173216 A1 | 10/2017 |

OTHER PUBLICATIONS

International Search Report and Written Opinion—PCT/US2018/061078—ISA/EPO—dated Feb. 11, 2019.

(Continued)

*Primary Examiner* — Rasheed Gidado
(74) *Attorney, Agent, or Firm* — Patterson & Sheridan, L.L.P

(57) ABSTRACT

Certain aspects of the present disclosure relate to communication systems, and more particularly, to efficient data scheduling in systems having a supplemental uplink carrier (SUL) configured. In some aspects, a method for wireless communications by a user equipment (UE) is provided. The UE receives signaling configuring the UE for uplink control channel transmission on a primary uplink carrier (PUL) or a SUL. The SUL is an uplink carrier not paired to a downlink carrier. The UE monitors in at least one search space for downlink control information (DCI) scheduling the UE for uplink data transmission to a cell on the PUL or the SUL. The UE sends one or more uplink data transmissions to the cell on the primary uplink carrier or the supplemental uplink carrier based on the DCI.

25 Claims, 10 Drawing Sheets

(51) Int. Cl.
*H04W 76/27* (2018.01)
*H04W 16/28* (2009.01)
*H04L 5/00* (2006.01)
*H04B 7/0413* (2017.01)

(52) U.S. Cl.
CPC ..... *H04W 72/042* (2013.01); *H04W 72/1289* (2013.01); *H04W 76/27* (2018.02); *H04B 7/0413* (2013.01); *H04L 5/001* (2013.01)

(56) References Cited

U.S. PATENT DOCUMENTS

| | | | |
|---|---|---|---|
| 2014/0064135 A1* | 3/2014 | Chen ................. | H04L 1/0046 370/253 |
| 2014/0119265 A1* | 5/2014 | Shauh ................ | H04W 4/06 370/312 |
| 2014/0119295 A1* | 5/2014 | Kanamarlapudi .... | H04L 5/0053 370/329 |
| 2014/0307644 A1 | 10/2014 | Kwong et al. | |
| 2017/0171848 A1* | 6/2017 | Xu ...................... | H04W 72/12 |
| 2019/0045533 A1* | 2/2019 | Chatterjee ......... | H04W 72/0446 |
| 2019/0075014 A1* | 3/2019 | Zhou .................. | H04L 41/0654 |
| 2019/0132862 A1* | 5/2019 | Jeon ................... | H04L 5/0092 |

OTHER PUBLICATIONS

MCC Support: "Draft Report of 3GPP TSG RAN WG1 #90bis v0.1.0," 3GPP Draft; DRAFT_MINUTES_REPORT_RAN1#90B_V010, 3rd Generation Partnership Project (3GPP), Mobile Competence Centre; 650, Route Des Lucioles ; F-06921 Sophia-Antipolis Cedex; France, vol. RAN WG1, No. Reno, USA; Nov. 27, 2017-Dec. 1, 2017, Oct. 19, 2017, XP051353748, 174 pages, Retrieved from the Internet: URL: http://www.3gpp.org/ftp/tsg_ran/WG1_RL1/TSGR1_90b/Report/ [retrieved on Oct. 19, 2017].

* cited by examiner

EFFICIENT DATA SCHEDULING WITH SUPPLEMENTAL UPLINK CARRIER

CROSS-REFERENCE TO RELATED APPLICATION & PRIORITY CLAIM

This application claims benefit of and priority to U.S. Provisional Patent Application Ser. No. 62/587,420, filed Nov. 16, 2017, herein incorporated by reference in its entirety as if fully set forth below and for all applicable purposes.

INTRODUCTION

Field of the Disclosure

Aspects of the present disclosure relate to wireless communications, and more particularly, to techniques for efficient data scheduling in a system having a supplemental uplink carrier (SUL) carrier configured.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving signaling configuring the UE for uplink control channel transmission on a primary uplink carrier (PUL) or a supplemental uplink carrier (SUL). The SUL is an uplink carrier not paired to a downlink carrier. The method also includes monitoring in at least one search space for downlink control information (DCI) scheduling the UE for uplink data transmission to a cell on the PUL or the SUL. The DCI includes a bit indicating the PUL or the SUL for the uplink data transmission. The method includes sending the uplink data transmission to the cell on the PUL or the SUL based on the DCI.

Certain aspects provide a method for wireless communication by a base station (BS). The method generally includes signaling a UE to configure the UE for uplink control channel transmission on a PUL or a SUL. The SUL is an uplink carrier not paired to a downlink carrier. The method also includes transmitting DCI on a downlink carrier scheduling the UE for uplink data transmission to a cell on the PUL or the SUL. The DCI includes a bit indicating the PUL or the SUL for the uplink data transmission.

Certain aspects provide an apparatus for wireless communication. The apparatus generally includes means for receiving signaling configuring the apparatus for uplink control channel transmission on a PUL or a SUL. The SUL is an uplink carrier not paired to a downlink carrier. The apparatus also includes means for monitoring in at least one search space for DCI scheduling the apparatus for uplink data transmission to a cell on the PUL or the SUL. The DCI includes a bit indicating the PUL or the SUL for the uplink data transmission. The apparatus also includes means for sending the uplink data transmission to the cell on the PUL or the SUL based on the DCI.

Certain aspects provide another apparatus for wireless communication. The apparatus generally includes means for means for signaling a UE to configure the UE for uplink control channel transmission on a PUL or a SUL. The SUL is an uplink carrier not paired to a downlink carrier. The apparatus also includes means for transmitting DCI on a downlink carrier scheduling the UE for uplink data transmission to a cell on the PUL or the SUL. The DCI includes a bit indicating the PUL or the SUL for the uplink data transmission.

Certain aspects provide another apparatus for wireless communication. The apparatus generally includes a receiver configured to receive signaling configuring the apparatus for uplink control channel transmission on a PUL or a SUL. The SUL is an uplink carrier not paired to a downlink carrier. The apparatus also includes at least one processor coupled with a memory. The at least one processor is configured to monitor in at least one search space for DCI scheduling the apparatus for uplink data transmission to a cell on the PUL or the SUL. The DCI includes a bit indicating the PUL or the SUL for the uplink data transmission. The apparatus also includes a transmitter configured to send the uplink data transmission to the cell on the PUL or the SUL based on the DCI.

Certain aspects provide another apparatus for wireless communication. The apparatus generally includes a transmitter configured to signal a UE to configure the UE for uplink control channel transmission on a PUL or a SUL. The SUL is an uplink carrier not paired to a downlink carrier. The transmitter is configured to transmit DCI on a downlink carrier scheduling the UE for uplink data transmission to a cell on the PUL or the SUL. The DCI includes a bit indicating the PUL or the SUL for the uplink data transmission.

Certain aspects provide a computer readable medium. The computer readable medium has computer executable code stored thereon for wireless communications. The computer executable code generally includes code for receiving signaling configuring a UE for uplink control channel transmission on a PUL or a SUL. The SUL is an uplink carrier not paired to a downlink carrier. The computer executable code also includes code for monitoring in at least one search space for DCI scheduling the UE for uplink data transmission to a cell on the PUL or the SUL. The DCI includes a bit indicating the PUL or the SUL for the uplink data transmission. The computer executable code also includes code for sending the uplink data transmission to the cell on the PUL or the SUL based on the DCI.

Certain aspects provide another computer readable medium. The computer readable medium has computer executable code stored thereon for wireless communications. The computer executable code generally includes code for signaling a UE to configure the UE for uplink control channel transmission on a PUL or a SUL. The SUL is an uplink carrier not paired to a downlink carrier. The computer executable code also includes code for transmitting DCI on a downlink carrier scheduling the UE for uplink data transmission to a cell on the PUL or the SUL. The DCI includes a bit indicating the PUL or the SUL for the uplink data transmission.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
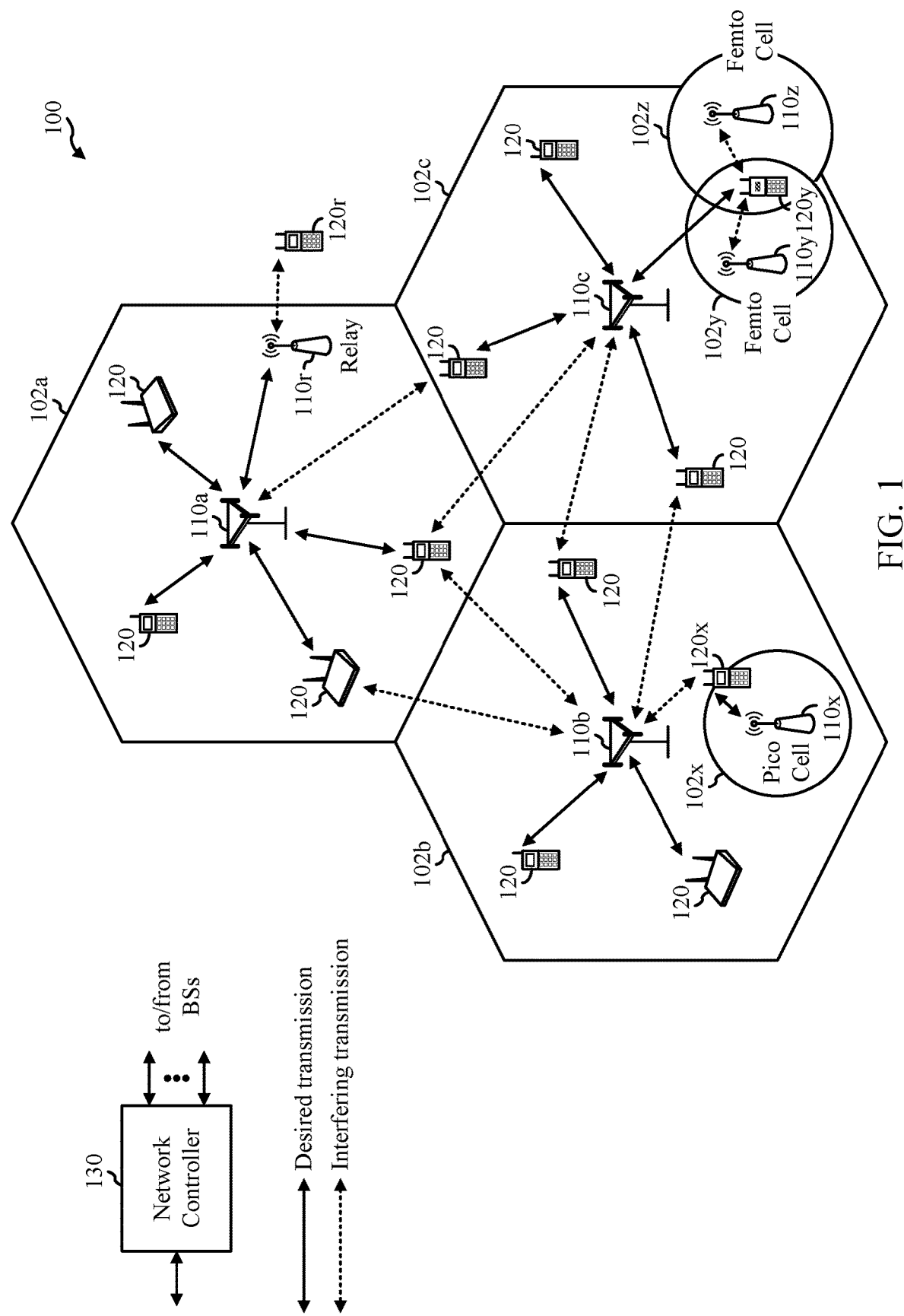
FIG. 1 is a block diagram conceptually illustrating an example telecommunications system, in accordance with certain aspects of the present disclosure.

Aspects of the present disclosure provide apparatus, methods, processing systems, and computer readable mediums for NR (new radio access technology or 5G technology). NR may support various wireless communication services, such as Enhanced mobile broadband (eMBB) targeting wide bandwidth (e.g., 80 MHz or beyond), millimeter wave (mmW) targeting high carrier frequency (e.g., 27 GHz or beyond), massive MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In some systems, such as NR, one or more supplemental uplink (SUL) carriers—not paired with a downlink carrier—can be configured in addition to the primary uplink carrier(s) (PUL). Thus, in some cases, there may be many uplink carriers to one downlink carrier. The scheduling cell may use cross-carrier scheduling on the downlink carrier sending downlink control information (DCI) scheduling one or more user equipment (UEs) for uplink data transmission to one or more cells on the uplink carriers, which may include SUL carrier and/or a PUL.

Aspects provide techniques and apparatus for efficient data scheduling in such system having a SUL carrier configured. Techniques for determining the search space, transmitting DCI, monitoring/receiving DCI, and for fallback DCI are provided herein, where the DCIs can schedule uplink data transmission(s) for a PUL and/or a SUL.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. As illustrated in FIG. 1, the wireless communication network 100 may include a number of base stations (BSs) 110 and user equipment (UE) 120. The UE 110 can receive signaling (e.g., radio resource control (RRC) signaling) from the BS 110 configuring the UE 120 for uplink control transmission (e.g., a physical uplink control channel (PUCCH) transmission) on a primary uplink carrier (PUL) or on a supplemental uplink carrier (SUL) in the unpaired spectrum. The UE 120 monitors for downlink control information (DCI) from the BS 110. The DCI schedules the UE 120 for uplink data transmission (e.g., physical uplink shared channel (PUSCH) transmission) to one or more cells on either the PUL or the SUL. For example, the DCI includes a bit indicating the PUL or the SUL for the schedule uplink data transmission. The UE 120 transmits data to one or more BS 110 based on the DCI.

A BS may be a station that communicates with UEs. Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). ABS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
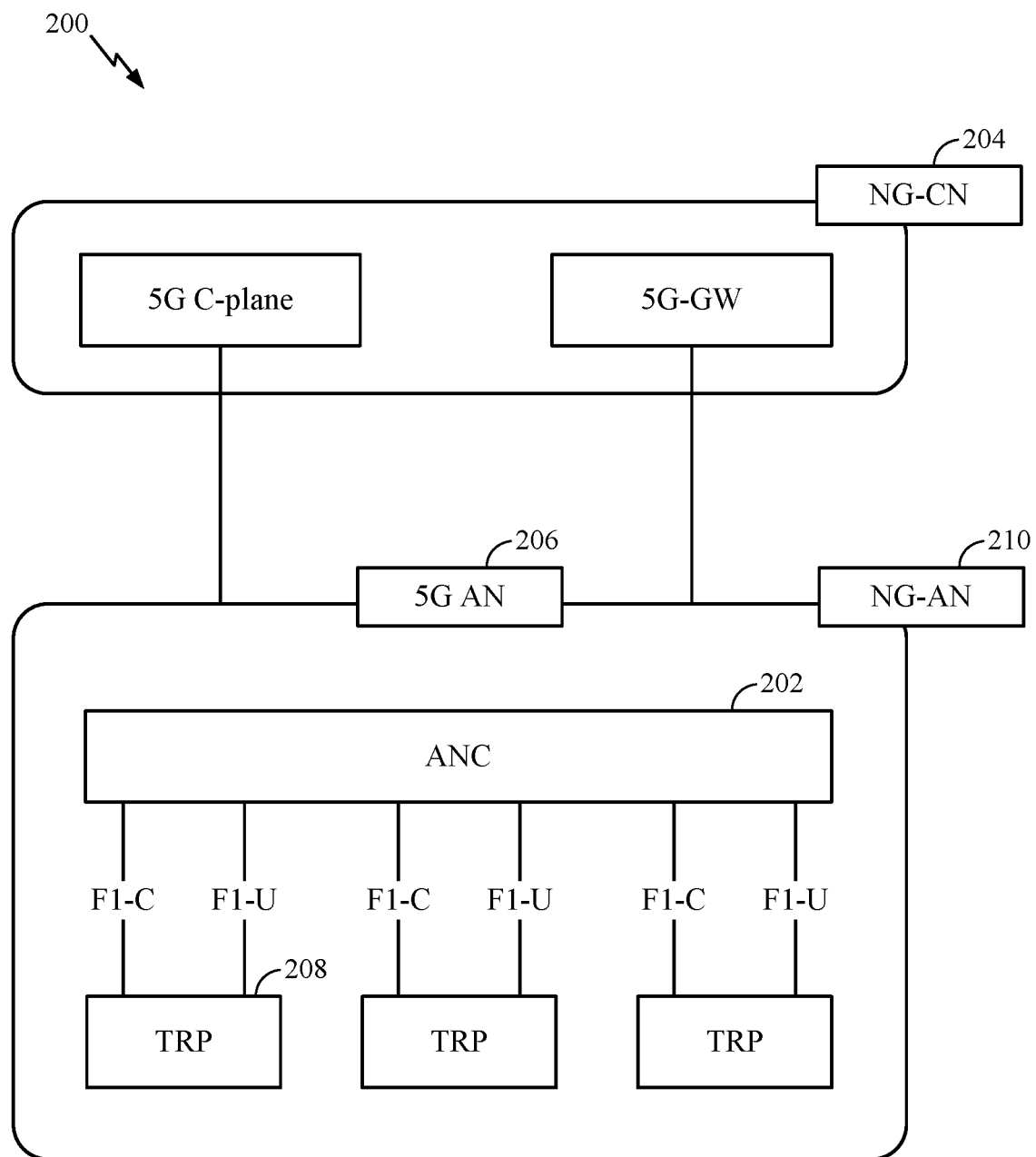
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
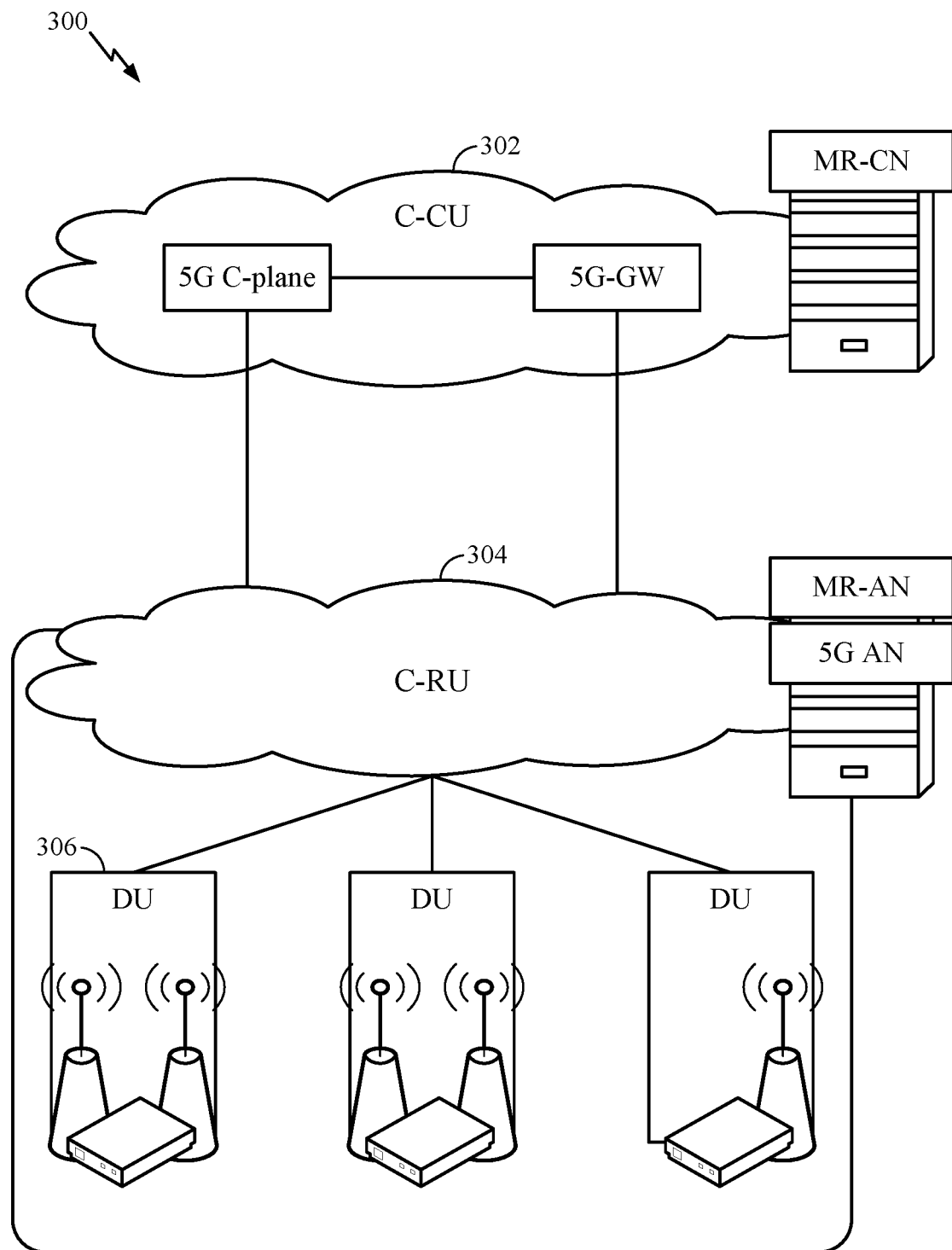
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
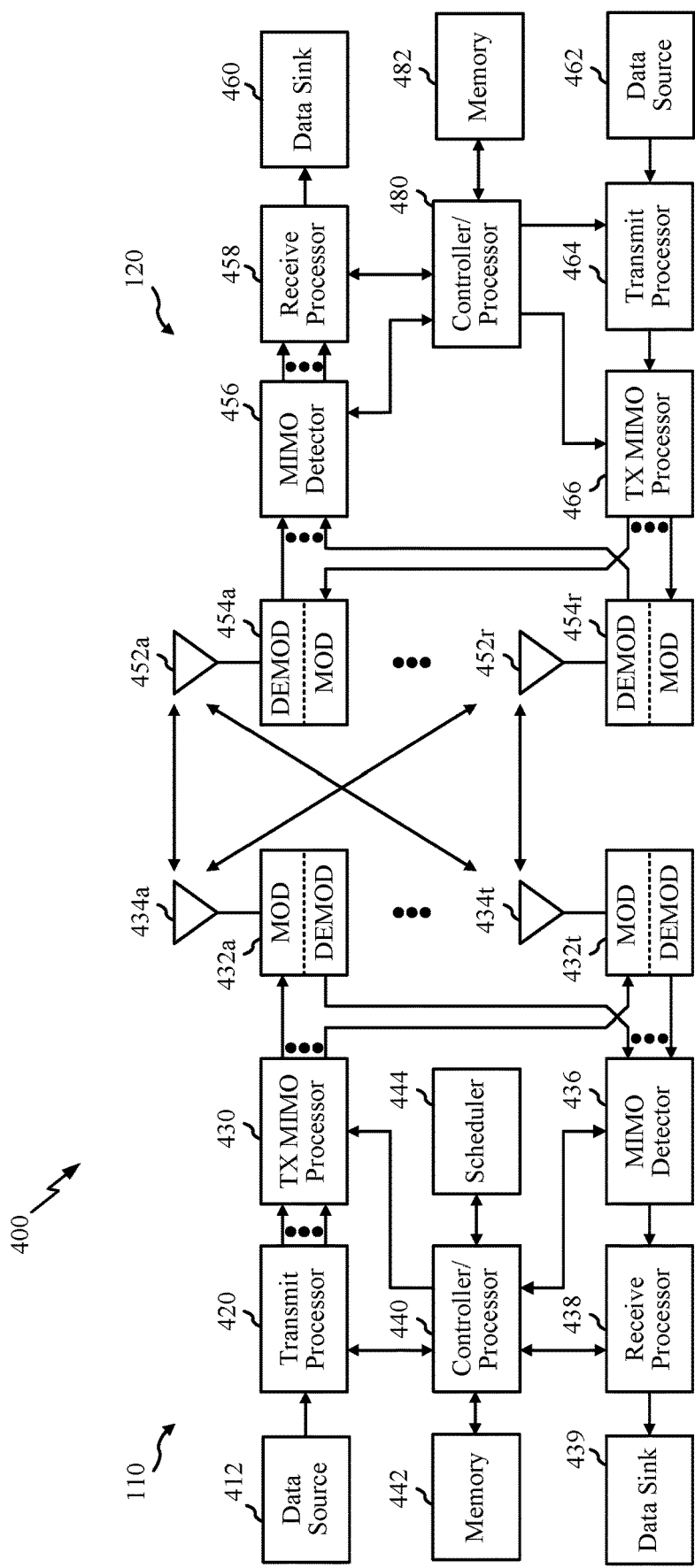
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein for efficient data scheduling on the SUL.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
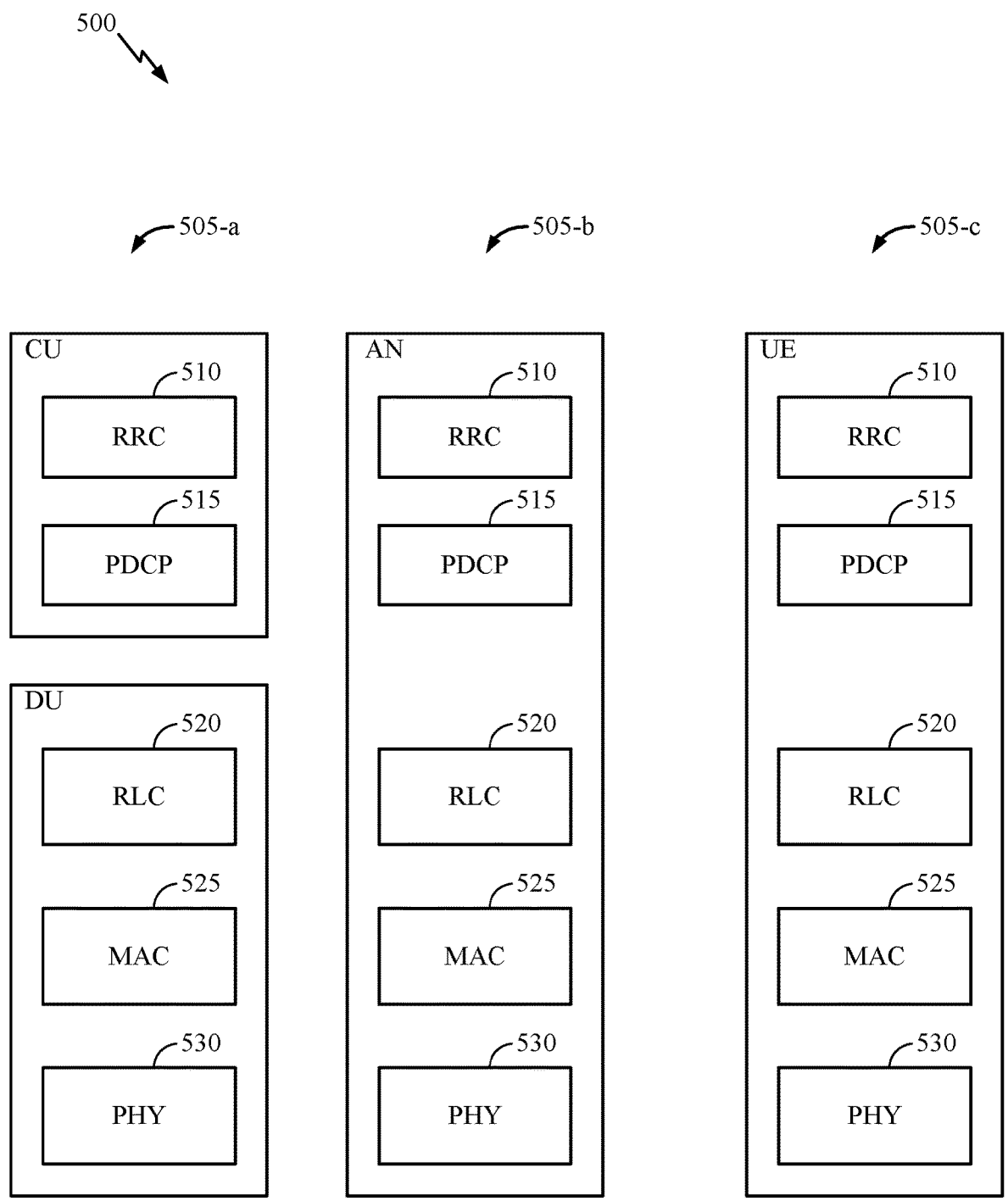
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
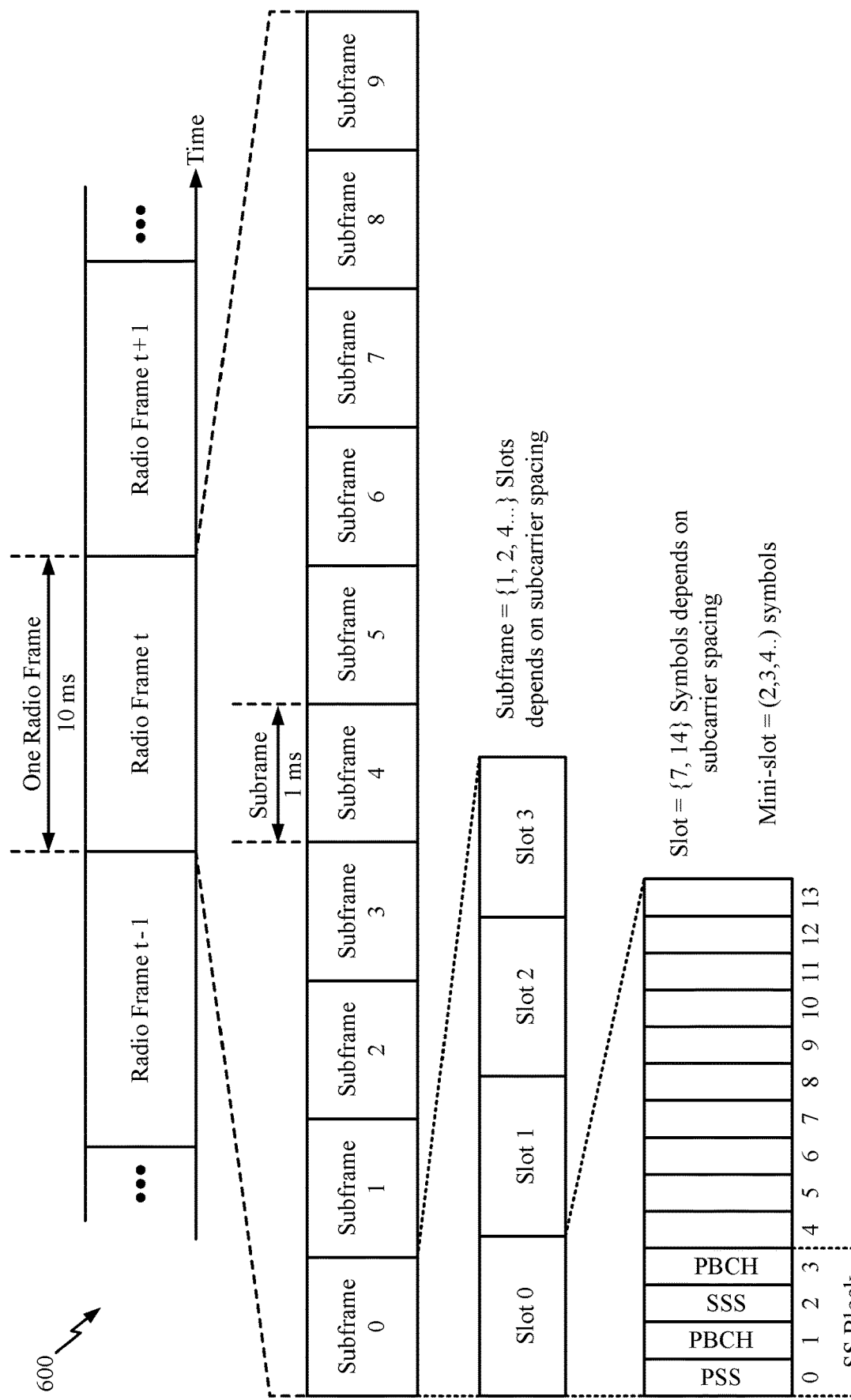
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

In NR (e.g., 5G), one or more control resource sets (coresets) may be supported for transmission of control information, such as downlink control information (DCI), which may be carried on the physical downlink control channel (PDCCH). A coreset may include one or more control resources (e.g., time and frequency resources) configured for conveying the control information. Within each coreset, one or more search spaces (e.g., common search space, UE-specific search space, etc.) may be defined for a given UE. As used herein, the term search space generally refers to the set of resources on which different decoding candidates for a channel of a defined format, such as a PDCCH, may be transmitted. Each decoding candidate refers to resources for one valid channel transmission. The number of valid decoding candidates depends on the size of the search space and the size (payload) of each channel.

A coreset may be defined in units of resource element groups (REGs). Each REG may include a fixed number (e.g., twelve, or some other number) of tones in one symbol period (e.g., a symbol period of a slot), where one tone in one symbol period is referred to as a resource element (RE). A fixed number of REGs may be included in a control channel element (CCE) (e.g., a CCE may include six REGs). Sets of CCEs may be used to transmit NR-PDCCH, with different numbers of CCEs in the sets used to transmit NR-PDCCH using differing aggregation levels. Multiple sets of CCEs may be defined as search spaces for UEs, and thus a BS (e.g., gNB) may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the BS.

A gNB may support coresets of different lengths that span multiple symbol periods (e.g., OFDM symbol periods). That is, the control channel candidates may be mapped to a single OFDM or multiple (e.g., two, three, etc.) OFDM symbols.

Certain wireless communication systems, such as NR, utilize multiple downlink (DL) component carriers (CCs) as part of a carrier aggregation (CA) scheme. For example, in addition to a primary DL CC, one or more supplemental DL (SDL) CCs may be used to enhance date throughput and/or reliability.

Figure 7:
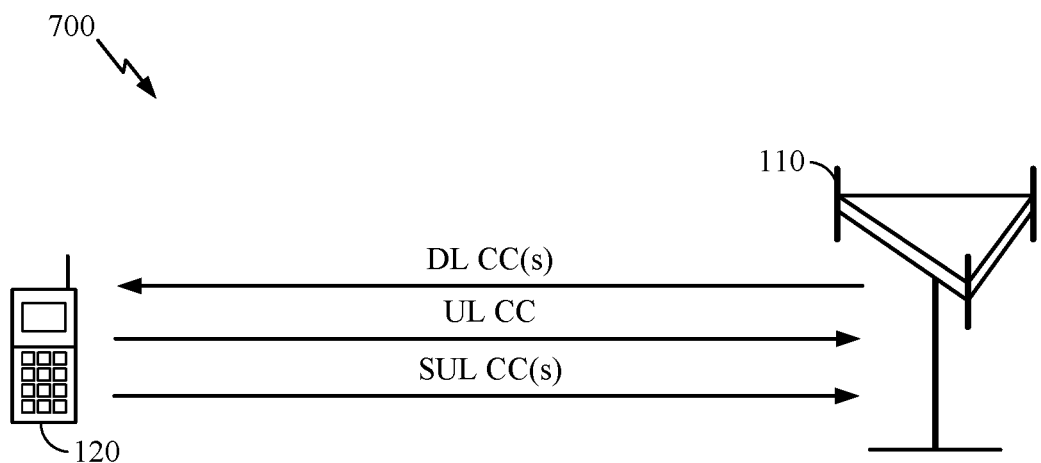
FIG. 7 illustrates an example scenario with primary uplink (PUL) component carrier(s) and supplemental uplink (SUL) component carrier(s) configured in a telecommunications system, in which aspects of the present disclosure may be practiced.
Figure 8:
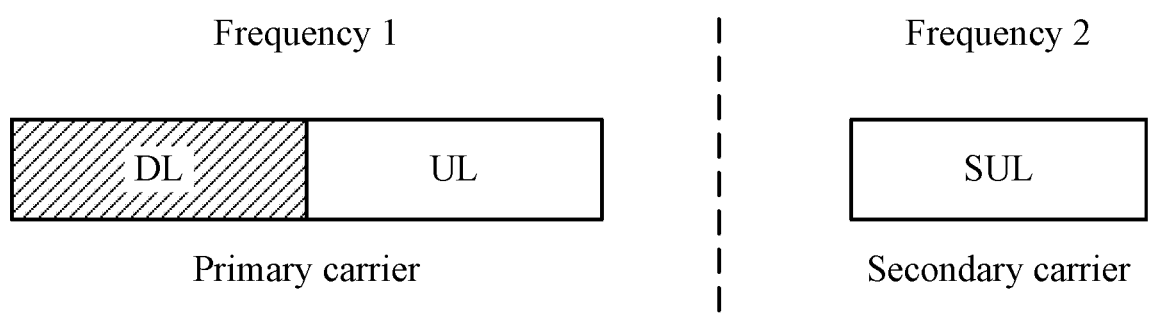
FIG. 8 illustrates example PUL and SUL frequency resources, in accordance with certain aspects of the present disclosure.

As illustrated in FIG. 7, certain systems, such as wireless communication network 100, utilize supplemental UL (SUL). Supplemental UL carrier(s) may generally refer to an UL CC without a corresponding DL CC (e.g., no paired DL, or, in unpaired spectrum) in the cell. As shown in FIG. 8, the primary CC includes a paired DL CC and UL CC on a first frequency resource and the SUL is an UL CC on a different frequency resource not paired with any DL CC. In other words, SUL may generally refer to the case when there is only UL resource for the carrier from the perspective of a device. SUL may allow for a scenario where there is one DL CC and multiple UL CCs in a cell. In some cases, there may be a one-to-multiple relationship between DL and UL. When cells are co-located, the SUL and primary UL (PUL) may belong to the same timing advance group. There may be one active bandwidth part (BWP) on the SUL carrier and one active bandwidth part (BWP) on the non-SUL UL carrier.

UE-specific RRC signaling may configure (or reconfigure, or de-configure) the location of uplink control channel signaling (e.g., PUCCH) by the UE either on the SUL carrier or on a non-SUL UL carrier (e.g., referred to as a PUL) in a SUL band combination.

In some aspects, the default location for uplink data transmissions (e.g., PUSCH) by the UE may be on the same carrier that is used/configured for the PUCCH—which may be a PUL carrier or SUL carrier. UE-specific RRC signaling may configure (or reconfigure, or de-configure) the UE for dynamic PUSCH scheduling on the default carrier (i.e., the PUCCH carrier) or the other carrier (i.e., non-PUCCH carrier) in the same cell as the SUL. In some examples, a carrier indicator field (CIF) in the DCI UL grant may be used to indicate (e.g., dynamically) whether the PUSCH is transmitted on the PUCCH carrier or on the other carrier. In some aspects, simultaneous PUSCH transmission on the SUL carrier and non-SUL UL carrier may not be supported.

Sounding reference signal (SRS) related RRC parameters may be independently configured for SRS on the SUL carrier and SRS on the non-SUL UL carrier in the SUL band combination. For example, SRS can be configured on the SUL carrier and non-SUL UL carrier, regardless of the carrier configuration for PUSCH and PUCCH.

Example Uplink Data Scheduling in System with SUL Configured

As described above, certain systems (e.g., wireless communication network 100), such as NR or 5G systems, can utilize supplemental uplink (SUL) in which one or more UL component carriers (CCs) are configured in the unpaired spectrum—not having a paired DL CC. Downlink control information (DCI), sent on a downlink carrier, may use cross-carrier scheduling of uplink data transmission(s) by the UE on a different CC, such as the SUL carrier.

As described above, in some cases for cross-carrier scheduling, UE (user equipment) specific search space (UESS) for the scheduling cell and for the scheduled cell(s) are separated by an offset (or offsets) if they are in the same control resource set (coreset). The offset may be based on (e.g., determined, derived, etc.) on a value, which may be the carrier index or carrier indicator field (CIF). When a UE is configured for cross-carrier DL/UL scheduling, CIF may be present in the DL/UL scheduling DCIs for both the serving cell for self-scheduling and the serving cells being cross-carrier scheduled.

Aspects provide techniques and apparatus for efficient data scheduling in such system having a SUL carrier configured. Techniques for determining the search space, transmitting DCI, monitoring/receiving DCI, and for fallback DCI are provided herein, where the DCIs can schedule uplink data transmission(s) for a PUL and/or a SUL.

Figure 9:
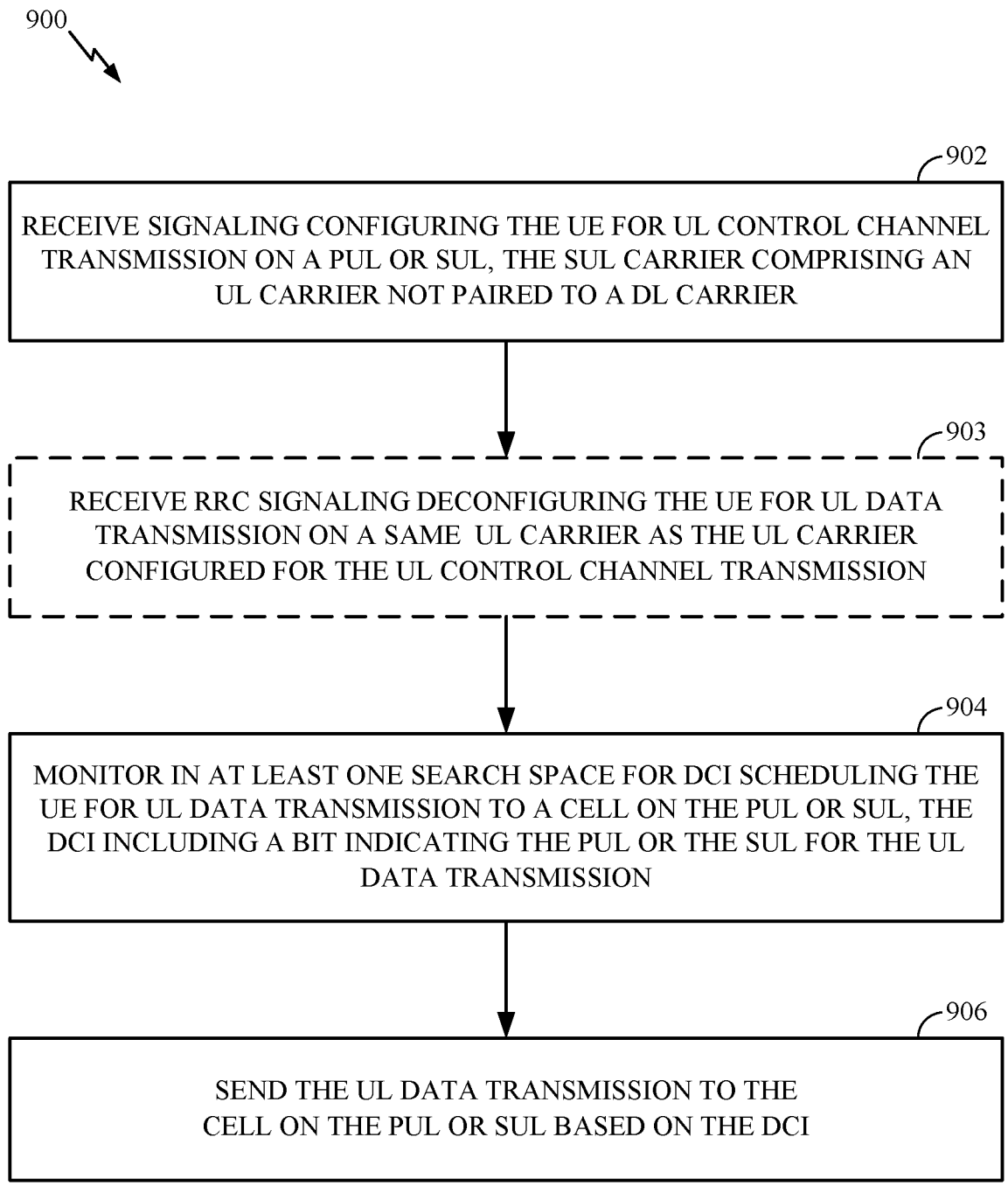
FIG. 9 illustrates example operations for wireless communications performed by a UE, in accordance with certain aspects of the present disclosure.

FIG. 9 illustrates example operations 900 for wireless communications, in accordance with aspects of the present disclosure. Operations 900 may be performed, for example, by a UE (e.g., such as a UE 120 in the wireless communication network 100).

Operations 900 begin, at 902, by receiving signaling (e.g., radio resource control (RRC) signaling) configuring the UE for uplink control channel (e.g., physical uplink control channel (PUCCH)) transmission on a primary uplink carrier (PUL) or a SUL. The SUL is an UL CC not paired to a DL CC.

Optionally, at 903, the UE may receive RRC signaling configuring the UE for dynamic scheduling of the uplink data transmission on the same or a different UL CC than the UL CC configured for the UL control channel transmission. For example, the RRC signaling may configure or de-configure the UE from using the default same UL CC as the UL control channel transmission.

At 904, the UE monitors in at least one search space for DCI(s) scheduling the UE for uplink data transmission (e.g., physical uplink shared channel (PUSCH) transmission) to a cell on the PUL or the SUL (or one cell on the PUL and another on the SUL). The DCI includes a bit indicating whether the UE uses the PUL carrier or the SUL carrier for uplink data transmission (e.g., whether PUSCH is on the PUCCH carrier or not). In some examples, the bit may be referred to as the UL/SUL indicator. In some examples, the bit is a CIF.

According to certain aspects, the UE monitors a same search space for PUL and the SUL. For example, the UE monitors DCI scheduling the UE for data transmission on the PUL carrier and for DCI configuring the UE for uplink data transmission on the SUL carrier in a same search space. The UE may determine (e.g., derive, compute) the search space for the SUL carrier and the PUL carrier using a same value (e.g., a same CIF). If the UE is not configured for simultaneous scheduling on PUL and SUL, there may be no need to separate the search spaces for the PUL and SUL. Sharing the search space reduces blind decoding at the UE. According to certain aspects, the DCI are in a same control resource set (coreset).

Alternatively, the UE can monitors different search spaces for PUL and SUL. For example, the UE monitors in a first search space for DCI scheduling the UE for UL data transmission on the PUL carrier and a second search space for DCI configuring the UE for UL data transmission on the SUL carrier. The second search space is offset from the first search space. In this example, the first search space may be determined (e.g., derived, computed) using a first CIF value and the second search space may be determined using a second CIF value that is different than the first CIF value.

At 906, the UE sends the uplink data transmissions to the cell on the PUL carrier or the SUL carrier based on the DCI.

According to certain aspects, a fallback DCI may be transmitted. For example, fallback DCI may be used when the transmission mode of the UE is unknown, when certain DCI formats are not supported by the UE, when the channel quality is poor, during RRC reconfiguration, etc. Fallback DCI may be smaller than the normal DCI, have higher coverage, and can always be decoded by the UE. Fallback DCI may be transmitted in PDCCH (e.g., type 0_0 PDCCH).

In some examples, the fallback DCI may not include a CIF. Thus, the DCI does not indicate in CIF whether data transmission is on the SUL or DUL. In this case, the UL fallback DCI may be targeted for only one of either the PUL or the SUL. For example, the fallback DCI carries information for only the configured carrier for the uplink control channel transmission (PUCCH carrier). Alternatively, although the DCI does not include a CIF, different DCI sizes can be used to indicate whether the DCI is for PUL or SUL.

In some examples, the DCI may use reserved padding bits in the uplink grant in the DCI to indicate the PUL or SUL for uplink data transmission (e.g., in place of a 1-bit CIF). In some examples, the fallback DCI may include the CIF. In some examples, the fallback DCI for UL may be configured only for common search space. In some cases, the fallback DCI for UL may be configured for UESS.

Figure 10:
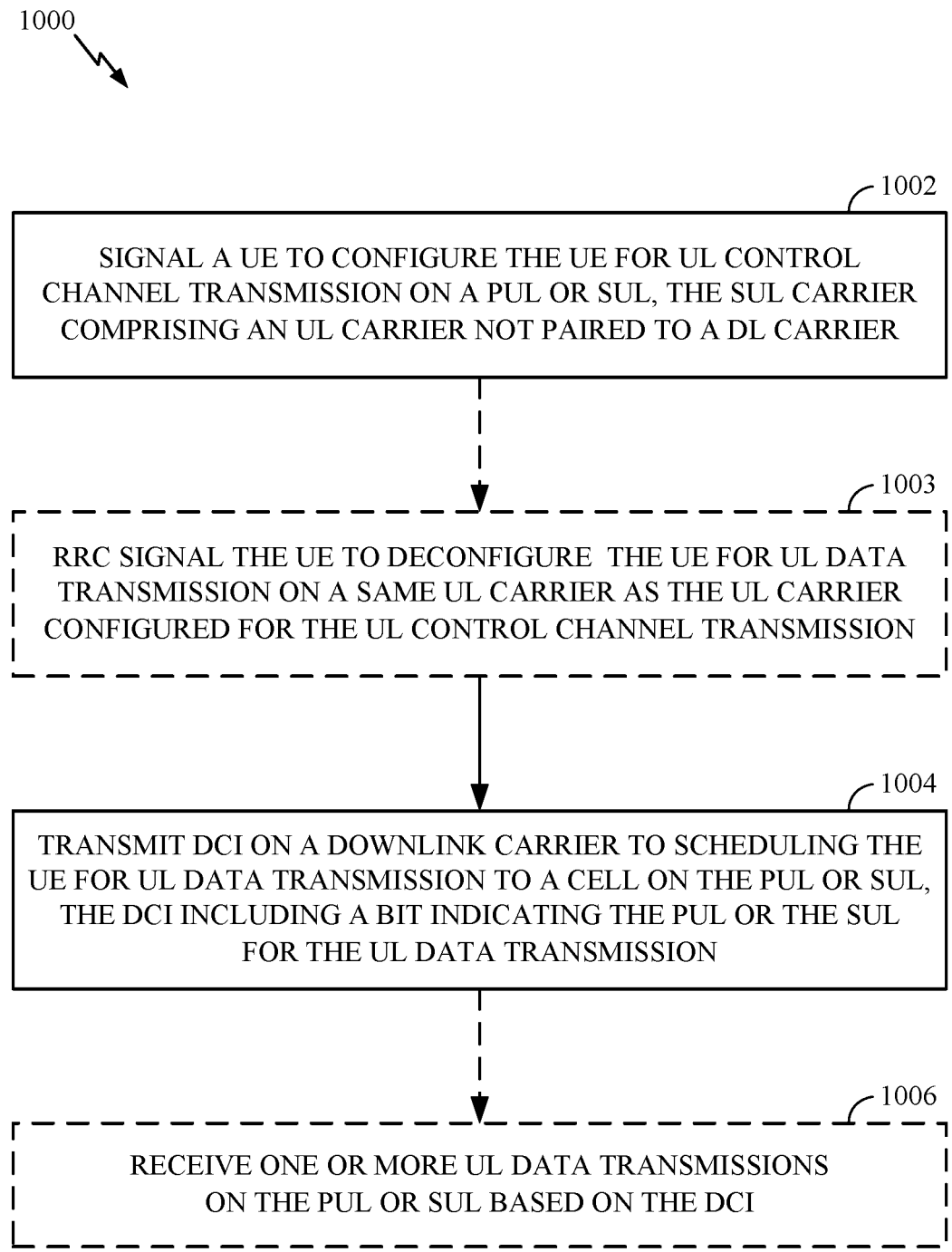
FIG. 10 illustrates example operations for wireless communications performed by a BS, in accordance with certain aspects of the present disclosure.

FIG. 10 illustrates example operations 1000 for wireless communications, in accordance with aspects of the present disclosure. Operations 1000 may be performed, for example, by a BS (e.g., such as a BS 110 in the wireless communication network 100). Operations 1000 may be complementary to the operations 900 performed by the UE.

Operations 1000 begin, at 1002, where the BS signals a UE to configure the UE for uplink control channel (e.g., PUCCH) transmission on a PUL carrier or SUL carrier. The SUL is an UL CC not paired to a DL CC. At 1003, optionally, the BS RRC signals the UE to configure the UE for dynamic scheduling of uplink data transmission (e.g., PUSCH) on the same or a different UL CC than the UL CC configured for the control channel transmission. For example, the BS sends RRC signaling to configure or de-configure the UE from using the default UL CC for the PUCCH as the UL CC for the PUSCH.

At 1004, the BS transmits DCI on a DL CC scheduling the UE for uplink data transmission to a cell on the PUL or SUL carrier (or to one cell on the PUL and another cell on the SUL). The DCI includes a bit indicating the PUL or the SUL for the UL data transmission.

At 1006, optionally, the BS receives an uplink data transmission from the UE on the PUL or SUL carrier based on the DCI.

Figure 11:
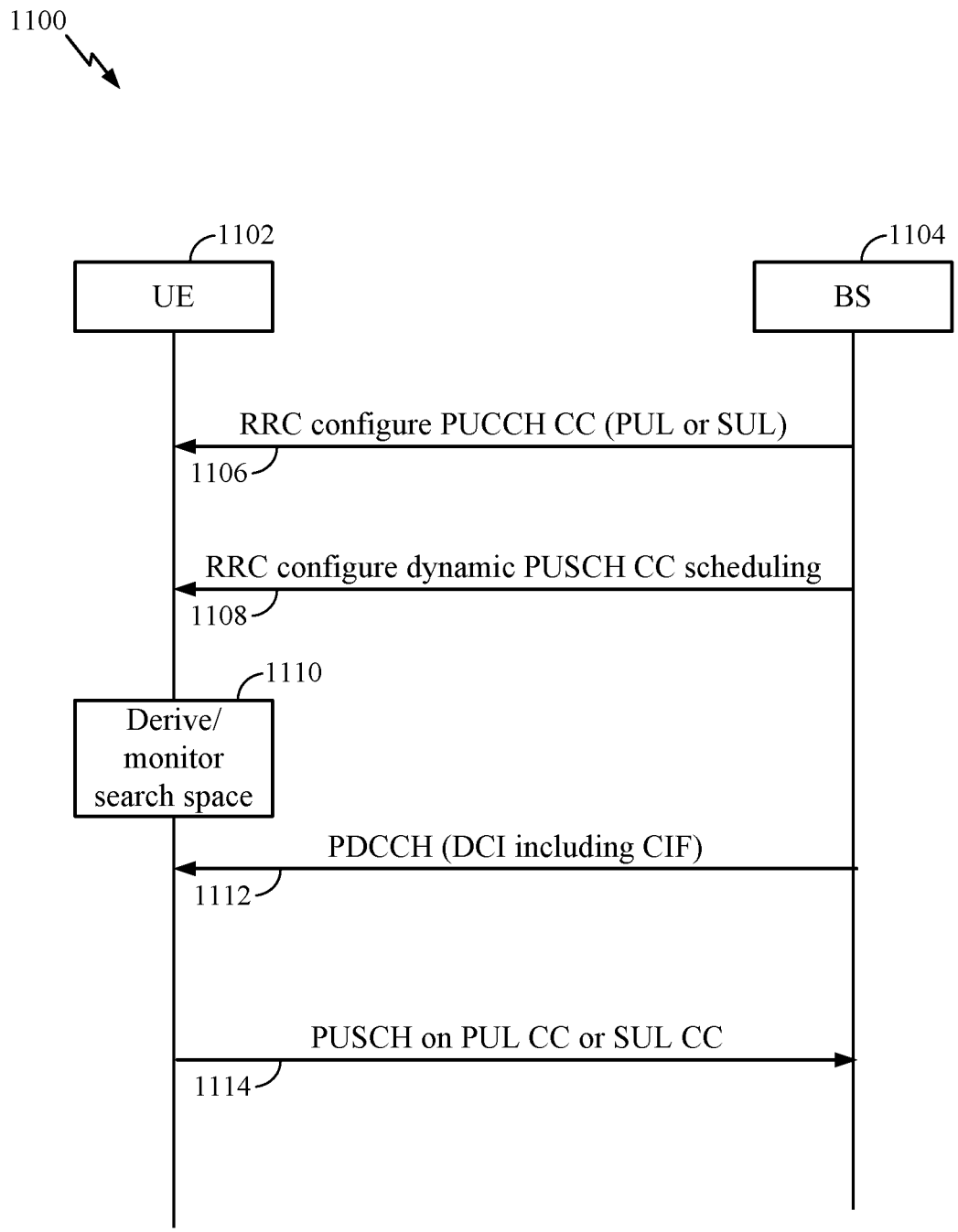
FIG. 11 is a call flow diagram illustrating example efficient data scheduling in a system having a SUL carrier configured, in accordance with certain aspects of the present disclosure.

FIG. 11 is a call flow diagram 1100 illustrating example efficient uplink data scheduling in a system having a SUL carrier configured, in accordance with certain aspects of the present disclosure. As shown in FIG. 11, at 1106, the BS 1104 (e.g., a BS 110) RRC configures the UE 1102 (e.g., a UE 120) with a carrier to use for PUCCH transmission, that is a PUL or SUL carrier. At 1108, the BS 1104 RRC configures the UE 1102 for dynamic PUSCH scheduling on the default PUCCH carrier or a different carrier. At 1110, the UE 1102 monitors search space for DCI from the BS 1104. For example, the UE 1102 monitors a shared search space (e.g., derived using a same CIF or value) for the PUL and SUL. In another example, the UE 1102 monitors separate (e.g., offset, derived using different CIF values) search spaces for the PUL and SUL. At 1112, the UE 1102 receives PDCCH from the BS 1104, on a DL CC, carrying the DCI including the dynamic indication of the PUSCH carrier (PUL or SUL). At 1114, the UE 1102 sends PUSCH on the carrier indicated in the DCI, i.e., the PUL or SUL carrier.

Aspects presented herein can be used for efficiently transmitting, receiving, and monitoring for DCI in system having SUL carrier(s) configured and for fallback DCI. The efficiency can improve the processing speeds and operation of a processing system, The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 9 and FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving signaling configuring the UE for uplink control channel transmission on a primary uplink carrier (PUL) or a supplemental uplink carrier (SUL), the SUL comprising an uplink carrier not paired to a downlink carrier;
   monitoring in at least one search space for a fallback downlink control information (DCI) scheduling the UE for uplink data transmission to a cell on the PUL or the SUL, the fallback DCI including a padding bit having a first value when indicating the PUL for the uplink data transmission and a second value when indicating the SUL for the uplink data transmission; and
   sending the uplink data transmission to the cell on the PUL or the SUL based on the fallback DCI.

2. The method of claim 1, wherein monitoring the at least one search space comprises monitoring a same search space for fallback DCI configuring the UE for data transmission on the PUL and for fallback DCI configuring the UE for uplink data transmission on the SUL.

3. The method of claim 2, further comprising:
   determining the search space for the SUL and the PUL using a same value.

4. The method of claim 1, wherein the at least one search space is a UE-specific search space or a common search space.

5. The method of claim 1, wherein the fallback DCI for the PUL and SUL are in a same control resource set (coreset).

6. The method of claim 1, further comprising receiving radio resource control (RRC) signaling configuring the UE for uplink data transmission on a different uplink carrier as the uplink carrier configured for the uplink control channel transmission.

7. The method of claim 1, wherein the SUL comprises an uplink carrier that cannot be scheduled for transmission concurrently with a transmission on the PUL.

8. The method of claim 6, wherein:
   the UE is configured to send the uplink data transmission on a same carrier as the uplink control channel transmission; and
   the RRC signaling reconfigures the UE to send the uplink data transmission on a different uplink carrier as the uplink carrier configured for the uplink control channel transmission.

9. The method of claim 1, wherein the fallback DCI excludes a carrier indicator field (CIF).

10. A method for wireless communications by a base station (BS), comprising:
    signaling a user equipment (UE) to configure the UE for uplink control channel transmission on a primary uplink carrier (PUL) or a supplemental uplink carrier (SUL), the SUL comprising an uplink carrier not paired to a downlink carrier; and
    transmitting a fallback downlink control information (DCI) on a downlink carrier scheduling the UE for uplink data transmission to a cell on the PUL or the SUL, the fallback DCI including a padding bit having a first value when indicating the PUL for the uplink data transmission and a second value when indicating the SUL for the uplink data transmission.

11. The method of claim 10, further comprising:
    receiving an uplink data transmission from the UE on PUL or the SUL based on the fallback DCI.

12. The method of claim 10, wherein the fallback DCI is for a UE-specific search space or a common search space.

13. The method of claim 10, wherein the fallback DCI for the SUL and PUL are in a same control resource set (coreset).

14. The method of claim 10, further comprising:
    sending radio resource control (RRC) signaling the UE to configure the UE for uplink data transmission on a different uplink carrier as the uplink carrier configured for the uplink control channel transmission.

15. An apparatus for wireless communications, comprising:
    means for receiving signaling configuring the apparatus for uplink control channel transmission on a primary uplink carrier (PUL) or a supplemental uplink carrier (SUL), the SUL comprising an uplink carrier not paired to a downlink carrier;
    means for monitoring in at least one search space for a fallback downlink control information (DCI) scheduling the apparatus for uplink data transmission to a cell on the PUL or the SUL, the fallback DCI including a padding bit having a first value when indicating the PUL for the uplink data transmission and a second value when indicating the SUL for the uplink data transmission; and
    means for sending the uplink data transmission to the cell on the PUL or the SUL based on the fallback DCI.

16. The apparatus of claim 15, wherein monitoring the at least one search space comprises monitoring a same search space for fallback DCI configuring the apparatus for data transmission on the PUL and for fallback DCI configuring the UE for uplink data transmission on the SUL.

17. The apparatus of claim 16, further comprising:
   means for determining the search space for the SUL and the PUL using a same value.

18. The apparatus of claim 15, wherein the at least one search space is a UE-specific search space or a common search space.

19. The apparatus of claim 15, wherein the fallback DCI for the PUL and SUL are in a same control resource set (coreset).

20. The apparatus of claim 15, further comprising means for receiving radio resource control (RRC) signaling configuring the apparatus for uplink data transmission on a different uplink carrier as the uplink carrier configured for the uplink control channel transmission.

21. An apparatus for wireless communications, comprising:
   a receiver configured to receive signaling configuring the apparatus for uplink control channel transmission on a primary uplink carrier (PUL) or a supplemental uplink carrier (SUL), the SUL comprising an uplink carrier not paired to a downlink carrier;
   at least one processor coupled with a memory and configured to monitor in at least one search space for a fallback downlink control information (DCI) scheduling the apparatus for uplink data transmission to a cell on the PUL or the SUL, the fallback DCI including a padding bit having a first value when indicating the PUL for the uplink data transmission and a second value when indicating the SUL for the uplink data transmission; and
   a transmitter configured to send the uplink data transmission to the cell on the PUL or the SUL based on the fallback DCI.

22. The apparatus of claim 21, wherein the at least one processor is configured to monitor a same search space for fallback DCI configuring the apparatus for data transmission on the PUL and for fallback DCI configuring the apparatus for uplink data transmission on the SUL.

23. The apparatus of claim 22, wherein the at least one processor is configured to determine the search space for the SUL and the PUL using a same value.

24. The apparatus of claim 21, wherein the at least one search space is a UE-specific search space or a common search space.

25. A non-transitory computer readable medium having computer executable code stored thereon for wireless communications, comprising:
   code for receiving signaling configuring a user equipment (UE) for uplink control channel transmission on a primary uplink carrier (PUL) or a supplemental uplink carrier (SUL), the SUL comprising an uplink carrier not paired to a downlink carrier;
   code for monitoring in at least one search space for a fallback downlink control information (DCI) configuring the UE for uplink data transmission to a cell on the PUL or the SUL, the fallback DCI including a padding bit having a first value when indicating the PUL for the uplink data transmission and a second value when indicating the SUL for the uplink data transmission; and
   code for sending the uplink data transmission to the cell on the PUL or the SUL based on the fallback DCI.

* * * * *